United States Patent
Suzuki (10) Patent No.: US 7,714,899 B2
(45) Date of Patent: May 11, 2010

(54) IMAGE PICKUP CAMERA AND PROGRAM FOR PICKING UP-AN OPTIMAL-STATE IMAGE OF A PRINT/PICTURE

(75) Inventor: Hideo Suzuki, Tokyo (JP)

(73) Assignee: Casio Computer Co., Ltd., Tokyo (JP)

(*) Notice: Subject to any disclaimer, the term of this patent is extended or adjusted under 35 U.S.C. 154(b) by 992 days.

(21) Appl. No.: 11/175,821

(22) Filed: Jul. 6, 2005

(65) Prior Publication Data

US 2006/0007325 A1    Jan. 12, 2006

(30) Foreign Application Priority Data

Jul. 9, 2004    (JP) .............................. 2004-202912

(51) Int. Cl.
    *H04N 5/228* (2006.01)
(52) U.S. Cl. .................................. 348/222.1; 382/176
(58) Field of Classification Search ................. 382/321, 382/176, 229; 348/222.1, 231.99, 231.2, 348/231.6
    See application file for complete search history.

(56) References Cited

U.S. PATENT DOCUMENTS

| | | | |
|---|---|---|---|
| 5,509,092 A * | 4/1996 | Hirayama et al. | ........... 382/301 |
| 6,430,320 B1 | 8/2002 | Jia et al. | |
| 7,149,353 B2 * | 12/2006 | Siegel et al. | ................. 382/190 |
| 2001/0014183 A1 | 8/2001 | Sansom-Wai et al. | |
| 2003/0086615 A1 | 5/2003 | Dance et al. | |
| 2003/0113015 A1 * | 6/2003 | Tanaka | ........................ 382/176 |

FOREIGN PATENT DOCUMENTS

| | | |
|---|---|---|
| JP | 10-229515 A | 8/1998 |
| JP | 2000-47579 A | 2/2000 |
| JP | 2003-58877 A | 2/2003 |
| JP | 2004-23158 A | 1/2004 |
| WO | WO 93/07581 A1 | 4/1993 |

OTHER PUBLICATIONS

Machine English Translation of JP 2004-023158 A (JP document published on Jan. 22, 2004).*
Japanese Office Action dated Feb. 3, 2009 (2 pages), and English translation thereof (1 page) issued in counterpart Japanese Application No. 2004-202912.
Japanese Office Action dated Mar. 28, 2009 and English translation thereof issued in a counterpart Japanese Application No. 2004-202912.
Xerox: "Technology Licensing Opportunity: Xerox Mobile Camera Document Imaging" Xerox Research Centre Europe, Mar. 1, 2004, pp. 1-11, XP002350689.

* cited by examiner

*Primary Examiner*—Lin Ye
*Assistant Examiner*—Nelson D Hernández Hernández
(74) *Attorney, Agent, or Firm*—Frishauf, Holtz, Goodman & Chick, P.C.

(57) ABSTRACT

An electronic camera includes a search unit for sequentially capturing and analyzing a monitor image for an object and for sequentially determining whether or not a figure of a specified form representing a print/picture image is included in the monitor image, and a memory for, responsive to determination that the figure is included in the monitor image, storing the monitor image including the figure as a candidate for the print/picture image.

8 Claims, 8 Drawing Sheets

FIG.1

DIGITAL STILL CAMERA

IMAGE PICKUP CAMERA AND PROGRAM FOR PICKING UP-AN OPTIMAL-STATE IMAGE OF A PRINT/PICTURE

CROSS-REFERENCE TO RELATED APPLICATIONS

This application is based upon and claims the benefit of priority from prior Japanese Patent Application No. 2004-202912, filed Jul. 9, 2004, the entire contents of which are incorporated herein by reference.

BACKGROUND OF THE INVENTION

1. Field of the Invention

The present invention relates to electronic cameras and more particularly to digital cameras that pick up and record an image of an object such as a print/picture and store it.

2. Description of the Related Art

In the past, electronic cameras are known that pick up and store an image of a print/picture including characters, figures and images. Such camera comprises a body attached through an arm to a stand on which an object whose image is to be picked up is placed such that the position at which the object image is picked up can be moved without moving the object and the camera body (see Japanese Patent Publication (KO-KAI) H10-229515). In order to correct a deformed image of characters written on a calling card, a postcard, a catalog, a signboard or a bulletin boards and picked up by a digital camera, a method and apparatus is known that extracts and corrects a four-sided figure of the image so as to provide a non-deformed rectangular image (see Japanese Patent Publication (KOKAI) 2003-58877).

The camera disclosed in Japanese Patent Publication (KO-KAI) H10-229515, however, requires a sliding member that moves the position at which the object image is picked up, thereby making the whole camera large-scale. The method and apparatus disclosed in Japanese Patent Publication (KO-KAI) 2003-58877, which refers to correcting a deformed four-sided figure image extracted from the picked-up image so as to provide a non-deformed rectangular image, presupposes correction of the picked-up image. Thus, when the original rectangular image is not picked up in an optimal state, that is, when the picked-up image is too small or when the picked-up image lacks partly, a preferable character image cannot be obtained even by retouching. For example, when the image pickup state of a calling card is bad, the characters printed on the calling card would be unclear. Thus, the whole frame of the calling card can not be extracted as rectangular. Accordingly, when the image of the calling card is picked up, careful pickup operation is required, for example, by finely adjusting the direction of the lens while performing the zooming-in/-out operation, which would impose a large burden on the user.

When a user picks up an image of an object such as a calling card, a post card, a catalogue, a signboard or a bulletin board having characters printed or written thereon, he or she often will have a hard time accommodating the object image in an optimal state within the frame image. Although the image of such object should preferably be picked up in a large size such that the characters may be read clearly, it would be meaningless to pick up an image of such object which is missing a part thereof that protrudes outward beyond the frame image. In order to avoid such situation, the user will peep into the monitor display screen while adjusting the zoom power and the image pickup direction to the respective optimal ones and then operate the shutter. However, if an object has characters of different sizes printed or written thereon, it is very difficult and troublesome to adjust the zoom power and the image pickup direction such that all the character images may be picked up. That is, there is a big possibility of failure in the image pickup.

BRIEF SUMMARY OF THE INVENTION

It is therefore an object of the present invention to provide a digital camera capable of easily picking up a monitor image including an image of a print/picture having a specified form.

In accordance with the present invention, there is provided an electronic camera comprising:

search means for sequentially capturing and analyzing a monitor image for an object and for sequentially determining whether or not a figure of a specified form representing a print/picture image is included in the monitor image; and memory means, responsive to determination that the figure is included in the monitor image, for storing the monitor image including the figure as a candidate for the print/picture image.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 3 is a part of a flowchart indicative of the whole operation of the digital still camera that will be started when the image pickup switch is turned on;

DETAILED DESCRIPTION OF THE INVENTION

Like reference numerals are used to denote like parts in the various figures of the accompanying drawings.

First Embodiment

Figure 1:
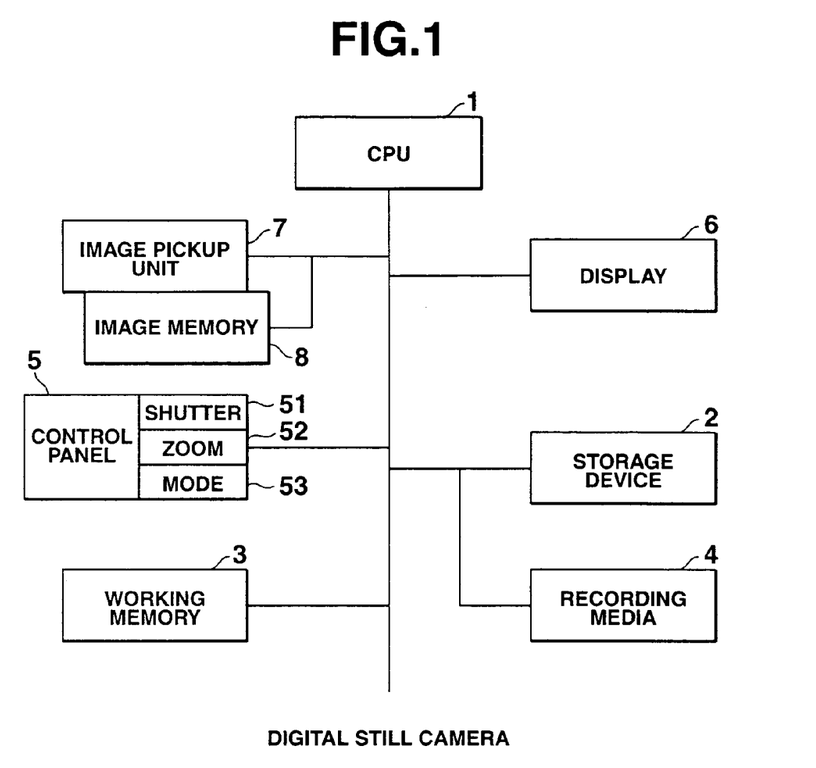
FIG. 1 is a block diagram of an electronic camera according to an embodiment of the present invention.

A first embodiment of an electronic or digital camera according to the present invention will be described with reference to FIGS. 1-7. As shown in FIG. 1, the digital camera comprises a portable digital still camera, for example, for use in a business meeting in a company such as a business talk, a briefing session or a deliberative council. The camera is adapted to pick up an image of a print/picture such as each of various sheet-like materials, calling cards, postcards, catalogs and whiteboards having characters, figures, images, etc., printed or written on thereon. Furthermore, the camera is also usable as a general camera that picks up an image of a general object such as a person or a landscape.

The feature of this camera is that the image of the print/picture can be picked up always in an optimal state without requiring any manually careful adjustment of the image pickup state of the camera, or without strictly adjusting the direction, zoom power and focus of the lens manually for an image of the object.

The structure of this camera will be described with reference to FIG. 1. CPU 1 controls the whole operation of the camera in accordance with an operating system and various application software stored in a storage device 2, which is a fixed memory such as a hard disk that includes a program storage area and a data storage area. The storage device 2 has stored in its program storage area application programs for operating the digital camera in accordance with the processing of FIGS. 3-7, a character recognition program that recognizes characters appearing on a picked-up image, and character recognition dictionaries that store various character patterns. The respective programs and data are loaded on a working memory 3, and data in the working memory 3 is saved to the storage device 2, as needed. A recording medium 4 comprises a removable memory such as a DVD that delivers/receives a program or image data to/from the storage device 2 and/or working memory 3.

CPU 1 is connected through a bus line to a control panel 5, a display 6, an image pickup unit 7 as input/output peripheral devices thereof and controls operation of these input/output devices in accordance with input commands. The control panel 5 comprises various function buttons such as a shutter button 51, a zoom button 52, a mode button 53 that selects one of a normal mode and a print/picture mode. An operation signal outputted from a respective one of these buttons is delivered to CPU 1. Display 6 comprises a liquid crystal display with a touch panel that is used as a monitor, finder or image reproduction display screen.

The image pickup unit 7 comprises a lens mirror block that in turn comprises an image pickup lens and a mirror; an image pickup element such as a CCD image sensor; and their driving systems. CPU 1 adjusts an optical zooming operation and the image pickup direction of the lens, drives an auto-focus mechanism and a shutter mechanism, and controls exposure.

Figure 2:
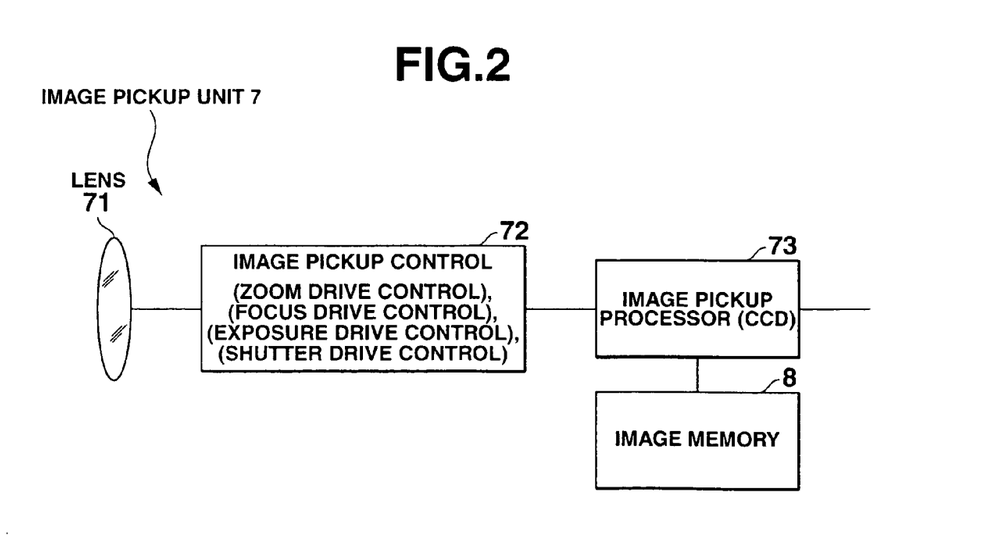
FIG. 2 illustrates the detailed structure of an image pickup unit of the camera.

In FIG. 2, the image pickup unit 7 comprises an image pickup lens 71, an image pickup control 72 and an image processor 73. CPU 1 provides zoom drive control, focus drive control, exposure drive control, and shutter drive control over the image pickup control 72. CPU 1 captures a picked-up image via an image memory 8 from the CCD image sensor of the image processor 73 and stores it on the recording medium 4.

The mode button 53 selects one of the normal mode and print/picture mode. In the normal mode, an image of a general object such as a person or a landscape is picked up usually. In the print/picture mode, monitor images are sequentially picked up and a monitor image including an image of a print/picture picked up in an optimal state is specified as a candidate for storage even when the image pickup conditions (for example, for the optical zoom) are not adjusted strictly. More particularly, in the print/picture-processing mode monitor images are analyzed sequentially and then checked as to whether they include white figures of a predetermined form (for example, of a rectangle) that include character images, thereby determining whether they are corresponding print/picture images. If so, the portion of the predetermined form is determined as the print/picture region and a character recognition is performed for the print/picture region. Recognition rates of characters for the respective print/picture images, representing their respective image pickup states, are calculated. A monitor image including a print/picture image of a highest character recognition rate is specified as a candidate to be stored. The character recognition rate represents the number of characters recognized normally among the characters included in the print/picture image. If the zoom power is incremented, the character recognition rate is increased, thereby allowing smaller characters be recognized normally.

Operation of the digital still camera of this embodiment will be described with reference to a flowchart of FIGS. 3-7. The respective functions of the camera described in the flowchart are stored in the form of a CPU readable program, in accordance with which the operation of the camera is executed in order. Alternatively, the camera can sequentially operate in accordance with program data received externally via a transmission medium (not shown).

In FIG. 3-7, first, when the image pickup switch is turned on, CPU 1 initially sets a normal mode (step S1), captures an object image from the image pickup unit 7, sets it in the image memory 8 (step S2), and then displays it on the monitor (step S3). CPU 1 then checks whether any one of the buttons was operated (step S4). If not, CPU 1 returns to step S2 and waits until any button is operated. When CPU 1 detects operation of any button, it determines which button has been operated; i.e., whether the mode button 53 has been operated (step S5), the zoom button 52 has been operated (step S6), or the shutter button 51 or another button was operated (step S7).

Figure 3:
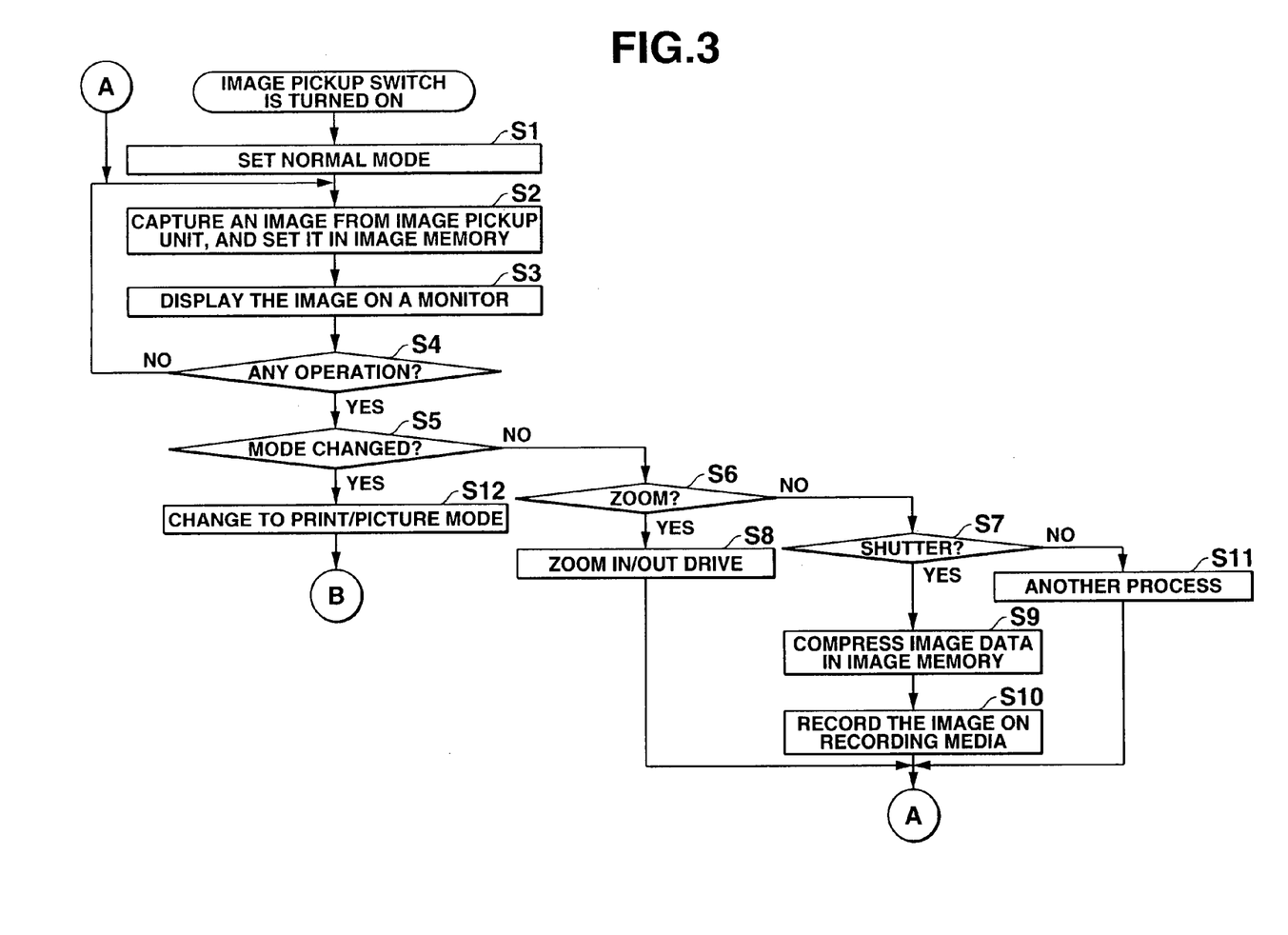

If the zoom button 52 has been operated in the initially set normal mode (YES in step S6), CPU 1 drives the optical zoom depending on the zoom-in or -out operation (step S8). When the shutter button 51 has been operated (YES in step S7), CPU 1 reads from the image memory 8 the image picked up by the operation of the shutter, compresses the image data in accordance with an orthogonal conversion (or discrete cosine conversion) system (step S9) and then stores the compressed data in the recording medium 4 (step S10).

If in the normal mode any one of the other buttons has been operated (NO in step S7), a corresponding process is performed (step S11), and then control returns to capturing a monitor image present at this time (step S2). If in the normal mode the mode button 53 has been operated (YES in step S5), the mode is changed from the normal mode to the print/picture mode (step S12), whereupon control passes to step S21 of FIG. 4 and then CPU 1 performs steps S21-S23 of FIG. 4 to determine whether a print/picture image has been picked up. More particularly, CPU 1 captures from the image pickup unit 7 a monitor image present when the print/picture mode was selected, and stores it in the image memory 8 (step S21). CPU 1 then analyzes the monitor image in the image memory 8 and determines whether or not an area of a specified object image (for example, of a white rectangular figure) is included in the monitor image (step S22). In this case, CPU 1 refers to preset print/picture images of specified objects such as a calling card, a post card, a catalog and a whiteboard (displayed in white rectangular figures), and determines whether an image part matching any one of the preset print/picture images in color and form is included in the monitor image (step S23).

Figure 4:
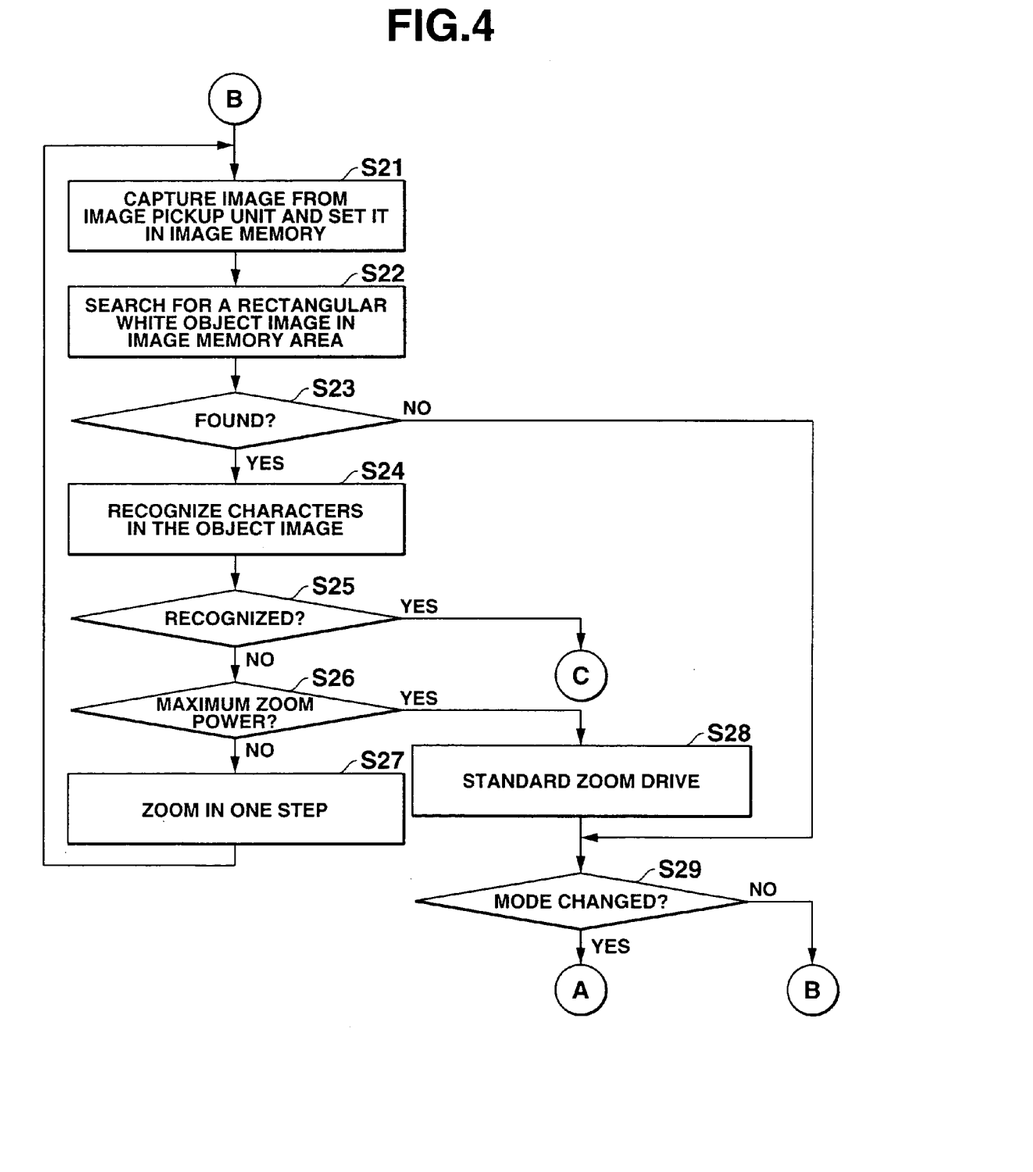
FIG. 4 is a second part of the flowchart continuing from FIG. 3.

If a specified object (or print/picture) image is included in the monitor image (YES in step S23), CPU 1 recognizes possible characters contained in an area of the print/picture image by extracting character images from the monitor image with the aid of the character recognition program and dictionaries stored in the storage device 2 (step S24). Then, CPU 1 determines whether at least one character has been recognized normally (step S25). In this case, if character images extracted from the monitor image include larger and smaller ones in a mixed state, CPU 1 determines whether at least one larger character has been recognized normally. If not (NO in step S25), CPU 1 acquires information on the present power of the optical zoom and then determines whether the power is maximum at this time (step S26).

If so, the optical zoom is automatically controlled so as to zoom out until it arrives at a standard zoom power (step S28). Then, CPU 1 checks whether the mode has been changed (step S29). If so, that is, if the mode has been changed from the print/picture mode to the normal mode, control returns to step S2 of FIG. 3. If not, control returns to step S21 where CPU 1 captures a monitor image present at this time from the image pickup unit 7 and then sets it in the image memory 8. If the zoom power is not at the maximum, the zoom power is caused to increment automatically one step (step S27), and then control returns to step S21 where CPU 1 captures a monitor image present at this time from the image pickup unit 7 and then sets it in the image memory 8. CPU 1 then repeats the above steps S21-S29, sequentially stepwise until at least one of the character images in the print/picture image area can be recognized normally.

Figure 5:
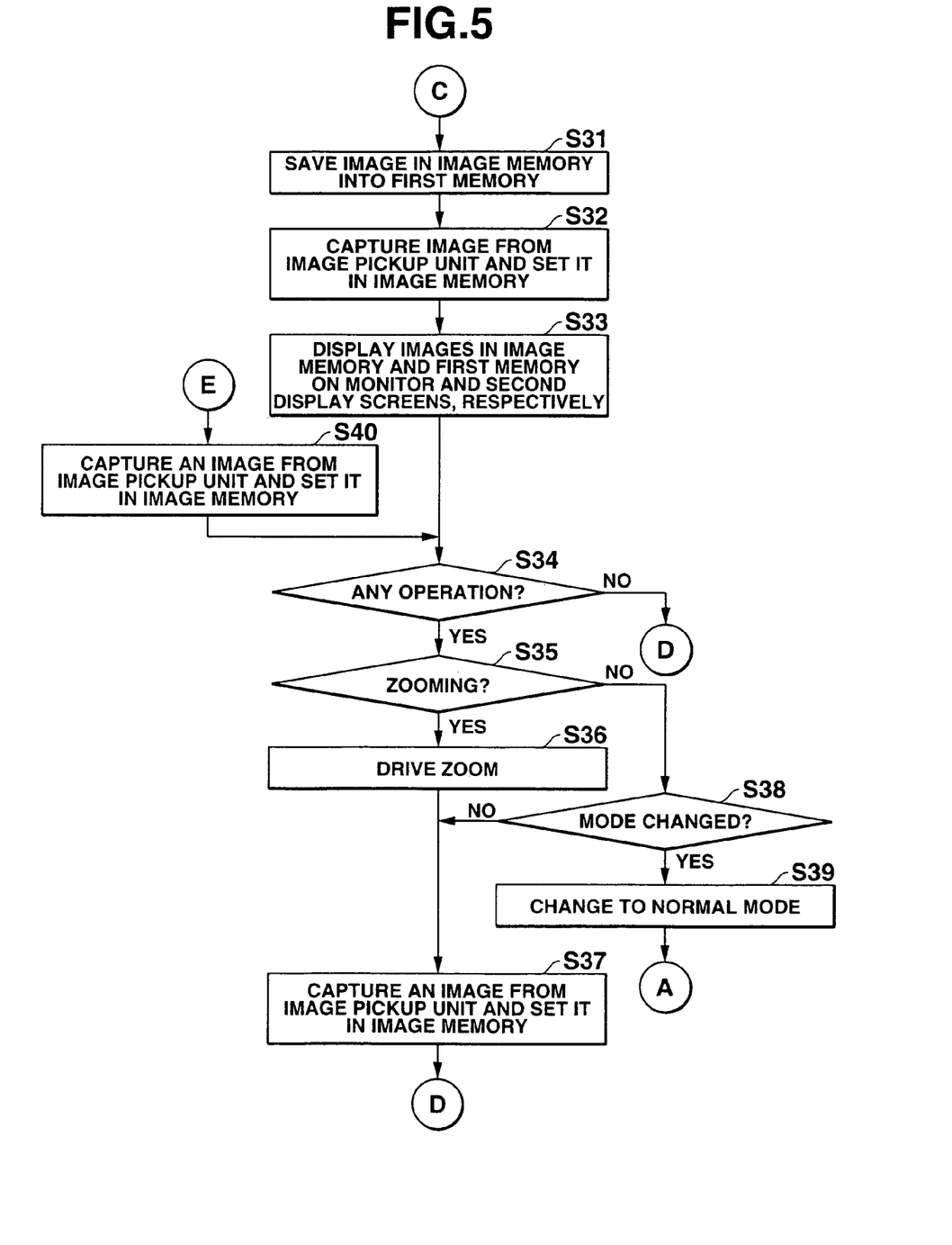
FIG. 5 is a third part of the flowchart continuing from FIG. 4.

As a result, when at least one of the characters in the print/picture image is recognized (YES in step S25), control passes to step S31 of FIG. 5, thereby saving the monitor image in the image memory 8 in a first memory (not shown) of the working memory 3. Then, CPU 1 captures a monitor image present at this time from the image pickup unit 7 and then sets it in the image memory 8 (step S32). CPU 1 then displays it on the monitor display screen and also displays the image saved in the first memory of the working memory 3 on a second display screen (not shown) different from the monitor display screen (step S33).

CPU 1 then checks whether any operation has been performed (step S34). If the zoom operation has been performed (step S35), CPU 1 controls the zooming drive in accordance with the zooming operation (step S36), captures a monitor image present at this time from the image pickup unit 7, and then sets it in the image memory 8 (step S37). Control then passes to step S41. When the mode changing operation has been performed (YES in step S38), CPU 1 changes the mode from the print/picture mode to the normal mode (step S39). Control then returns to step S2 of FIG. 3. If any operation has not been performed, control passes to step S37 where CPU 1 captures a monitor image present at this time from the image pickup unit 7, and then sets it in the image memory 8.

Figure 6:
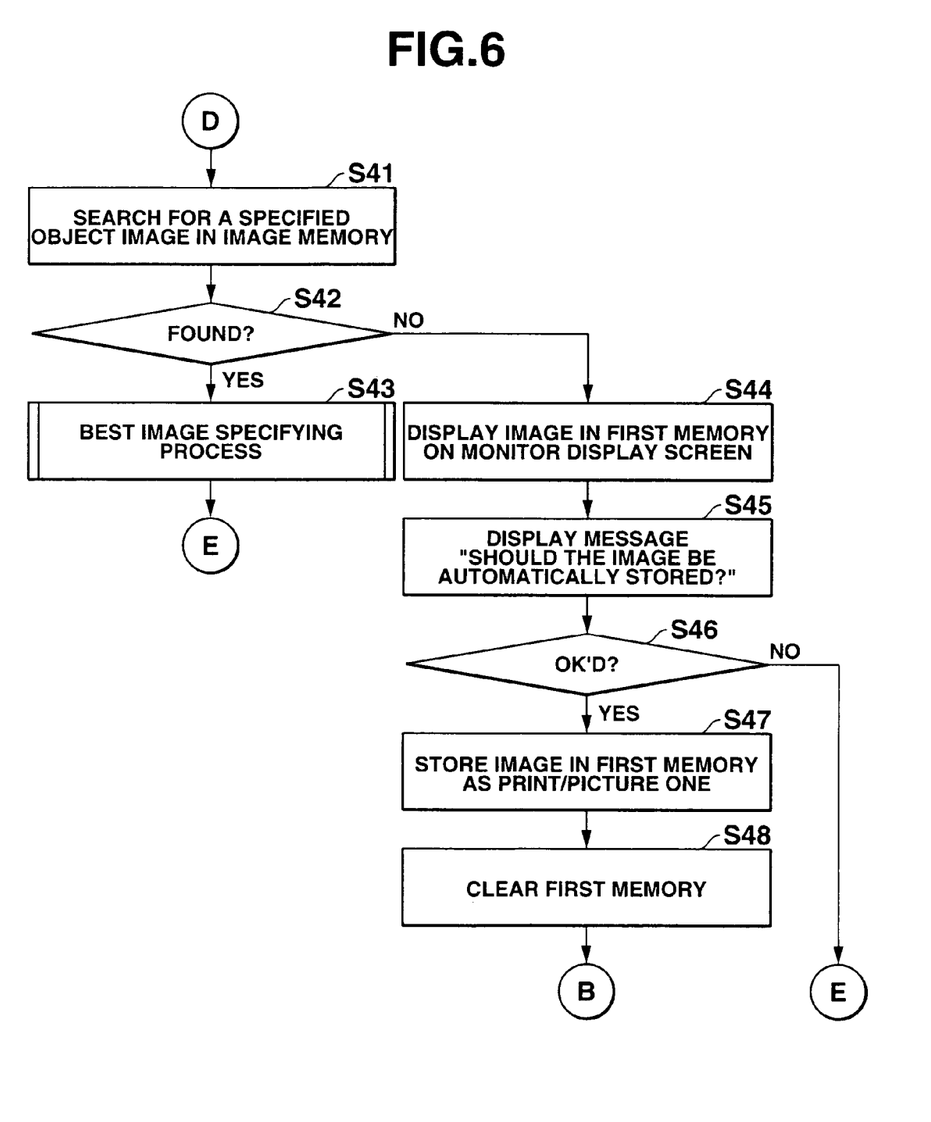
FIG. 6 is a fourth part of the flowchart continuing from FIG. 5.

Control then passes to step S41 of FIG. 6, where CPU 1 analyses the monitor image in the image memory 8 as in the above case, and checks whether a specified object image (shown in a white rectangular figure) is included in the monitor image (step S42). If so (YES in step S42), control then passes to a best image specifying process that comprises specifying as a best image candidate to be saved the monitor image that includes a print/picture image picked up in its best state (step S43).

Figure 7:
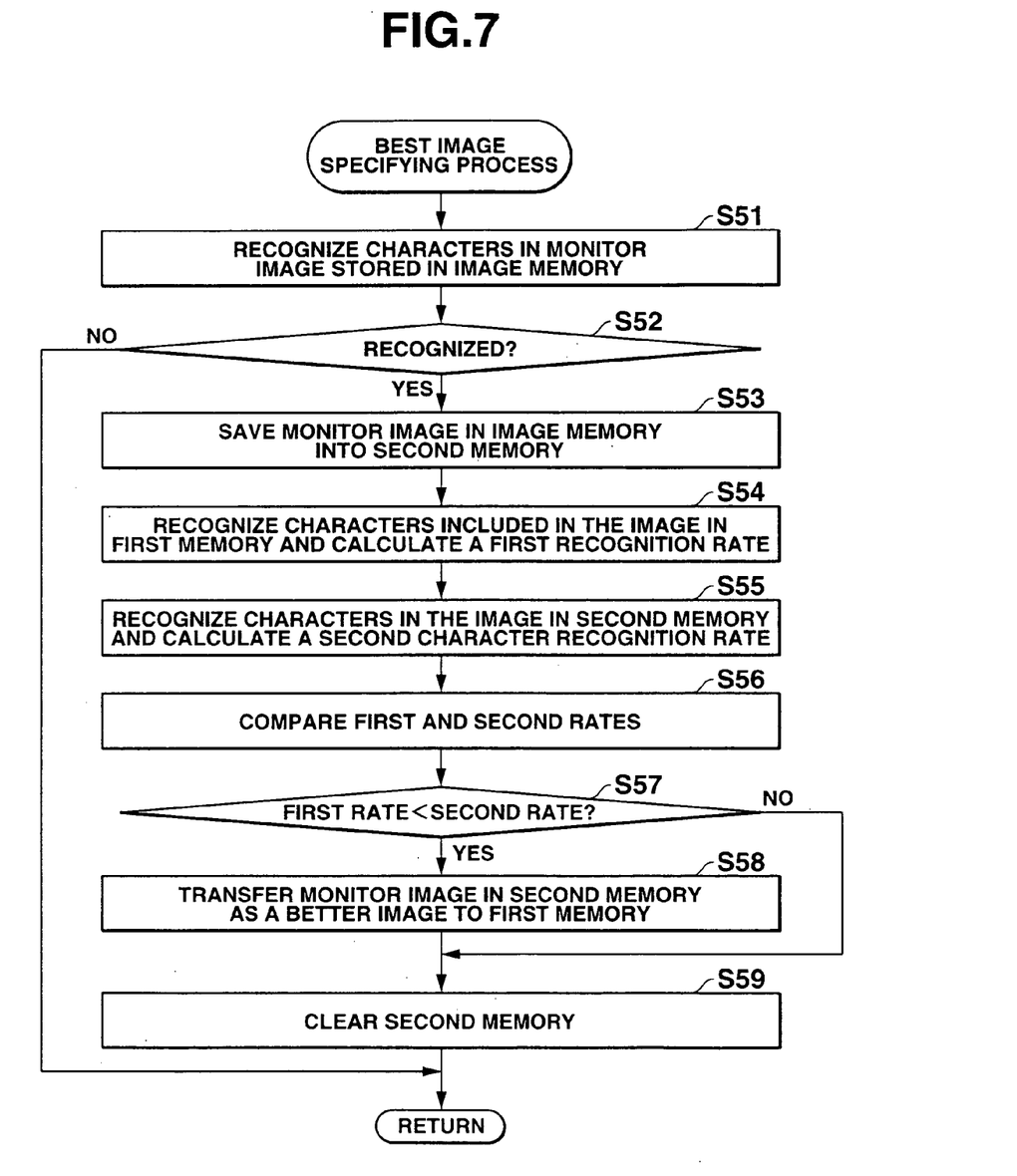
FIG. 7 is a flowchart of a best image specifying process.

FIG. 7 is a flowchart indicative of the details of the best image specifying process. First, CPU 1 tries to recognize the characters extracted from the monitor image set in the image memory 8 (step S51). If no characters are recognized (NO in step S52), control passes to step S40 of FIG. 5 where CPU 1 captures a monitor image present at this time from the image pickup unit 7 and then sets it in the image memory 8. Then, CPU 1 checks whether any operation has been performed (step S34). When the at least one of the characters is recognizes normally (YES in step S52), CPU 1 saves the monitor image in the image memory 8 into the second memory (not shown) of the working memory 3 (step S53). Then, CPU 1 reads the monitor image in the first memory of the working memory 3, recognizes all the characters included in the monitor image, and calculates a recognition rate (referred to hereinafter as a first recognition rate) of the characters (step S54). Similarly, CPU 1 then reads the monitor image in the second memory of the working memory 3, recognizes all the characters included in the monitor image, and calculates a recognition rate (hereinafter referred to as a second recognition rate) of the characters (step S55). CPU 1 then compares the first recognition rate with the second one and specifies a higher recognition rate (step S56). If the first recognition rate is lower than the second one (YES in step S57), CPU 1 determines that the image pickup state of the print/picture image in the second memory is better than that of the monitor image in the first memory and transfers the monitor image present in the second memory as a better one at this time to the first memory, thereby rewriting its content or updating the better image (step S58). CPU 1 then clears the content of the second memory (step S59). If the first recognition rate is not less than the second one (NO in step S57), CPU 1 determines that the image pickup state of the monitor image in the first memory is better than that of the monitor image in the second memory, and then clears the content of the second memory while maintaining the monitor image in the first memory as the better one (step S59).

Then, control passes to step S40 of FIG. 5 where CPU 1 captures a monitor image present at this time from the image pickup unit 7, sets it in the image memory 8, and then checks whether any operation has been made (step S34). If the zooming operation has been performed (step S35), CPU 1 controls the zoom drive operation in accordance with the zooming operation (step S36). CPU 1 then captures a monitor image present at this time from the image pickup unit 7, and then sets it in the image memory 8 (step S37). Then, control passes to step S41 of FIG. 6 where CPU 1 repeats the above steps S41-S48. As a result, each time the conditions that the first recognition rate is less than the second one are met, CPU 1 updates the better image in the first memory (step S58).

When no white rectangle representing the specified object image is contained in the monitor image due to changes in the zoom power and/or the image pickup direction while the better image is being updated (NO in step S42 of FIG. 6), CPU 1 reads the better image in the first memory, displays it on the monitor display screen (step S44), and then displays a message inquiring whether or not the better image should be automatically saved (step S45). If an "OK" operation is performed (YES in step S46), CPU 1 records the better image in the first memory as an actually picked-up print/picture image on the recording media 4 (step S47), and then clears the best image in the first memory (step S48). If no commands are given (NO in step S46), control then passes to step S40 of FIG. 5 where CPU 1 captures a monitor image present at this time from the image pickup unit 7, sets it in the image memory 8, and then checks whether any operation has been performed (step S34).

As described above, in the digital camera of the first embodiment, CPU 1 controls the image pickup unit 7 so as to adjust the pickup conditions of the print/picture image in accordance with the condition changing operation thereof. Then, when the respective print/picture images should be picked up, CPU 1 sequentially captures monitor images from the image pickup unit 7 while analyzing these monitor images, recognizes the characters included in each of the print/picture images of the monitor images, calculates the respective character recognition rates for the print/picture images, compares the character recognition rates for the respective monitor images, thereby specifying a print/picture image picked up in a best state, and a monitor image including this print/picture image as a candidate to be saved. Thus, even when the pickup conditions of a specified print/picture image are not manually adjusted carefully, the print/picture image picked up in its best state can be specified as a candidate to be saved. A print/picture image in which all the characters appear clearly although they are different in size can be selected as a best image candidate to be saved and then recorded.

In this case, CPU 1 temporarily stores the monitor image specified as a better one at present in the first memory of the working memory 3, then temporarily stores a new monitor image obtained this time in the second memory, and compares the character recognition rates of the print/picture images included in the monitor images stored in the first and second memories. If the character recognition rate of the monitor image stored in the second memory is higher than that stored in the first one, CPU 1 rewrites the content of the first memory with the monitor image of the higher rate as a better one. CPU 1 then repeats such operations, so that even when all the monitor images are not saved temporarily, it will suffice for storage of the only image specified as the better one at present, thereby preventing an increase in the working memory capacity, and also can update the old better image by the time when a next monitor image is acquired, and hence specifying a new better image can be performed efficiently.

When a better image is specified as the candidate to be saved, this candidate is displayed on a display screen different from the monitor one. Thus, the user can visually compare this better image and the monitor image present at this time and can adjust the zoom, as required. The user also can recognize whether the print/picture image area has disappeared from the monitor picture by analyzing the same, whereupon the user can determine the better image as one to be saved and records it on the recording media 4. When the user gives a command to record the displayed best image, this image is recorded as such on the recording media 4. Thus, the user can record a desired image.

Embodiment 2

Figure 8:
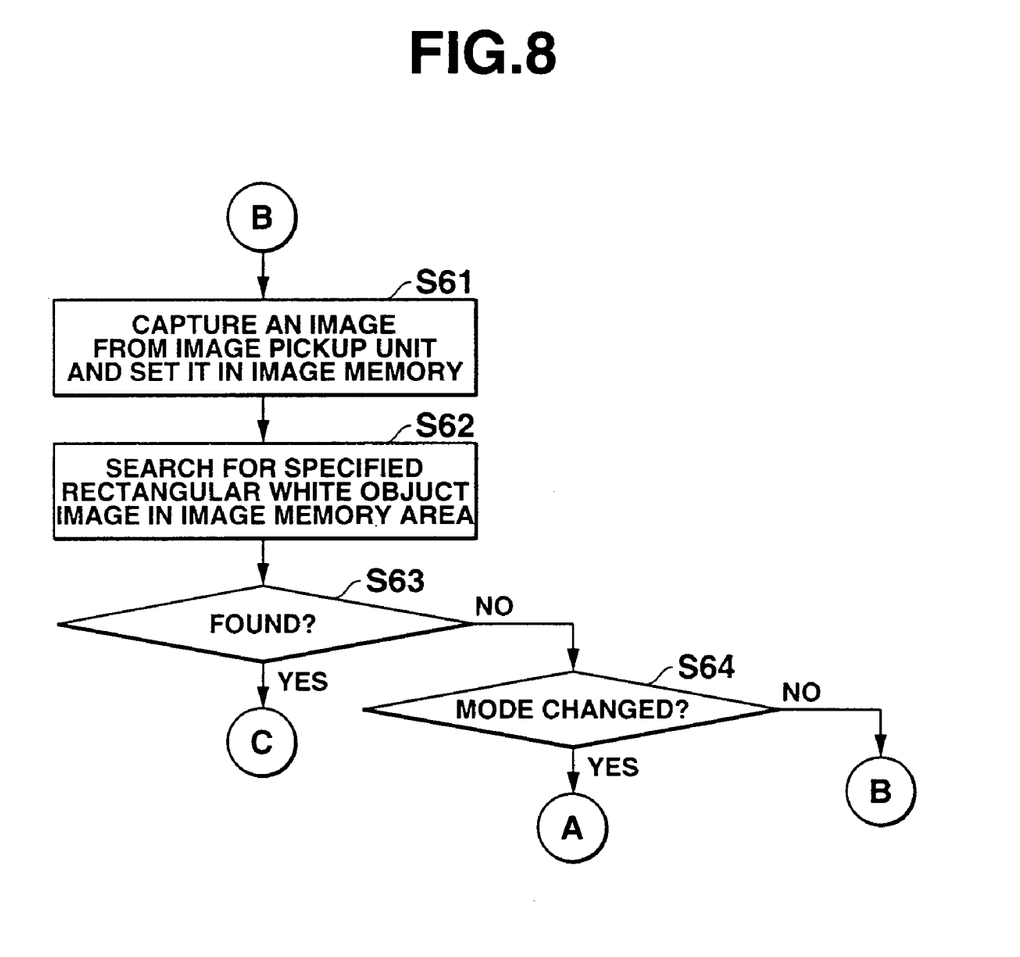
FIG. 8 is a flowchart corresponding to FIG. 4 indicative of operation of a second embodiment of the present invention.
Figure 9:
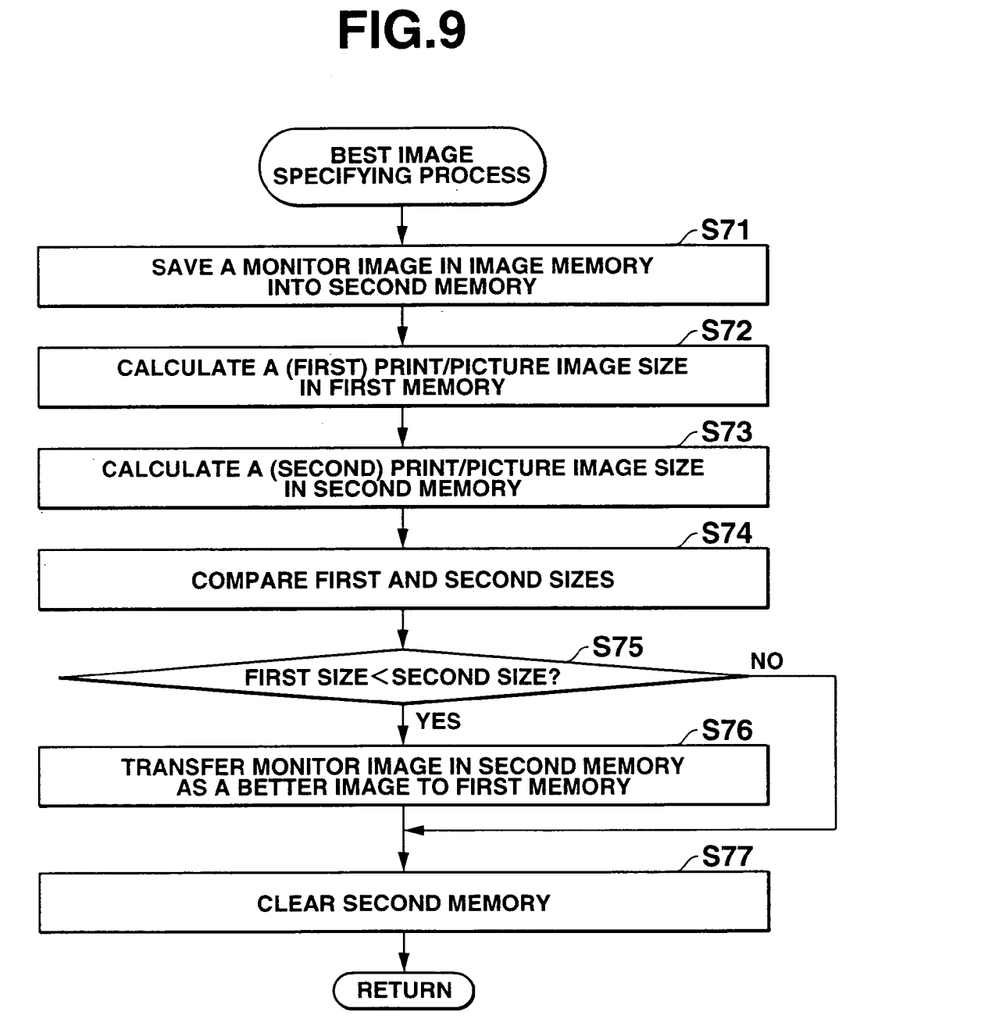
FIG. 9 is a flowchart corresponding to FIG. 7 indicative of operation of the second embodiment of the present invention.

Referring to FIGS. 8 and 9, a second embodiment of the invention will be described. While in the first embodiment (1) the characters of the print/picture image of each of the monitor images are recognized, (2) the character recognition rates for the respective print/pictures are calculated, and (3) the respective character recognition rates are compared, thereby specifying a better image, in the second embodiment a better image is specified by calculating the respective sizes of the print/picture image areas included in the monitor images and comparing the sizes.

The subject matters of the second embodiment different from those of the first one will be mainly described.

FIGS. 8 and 9 are a flowchart of an operation of the second embodiment and correspond to FIGS. 4 and 7, respectively, of the first embodiment. The operation of the first embodiment shown in FIGS. 3, 5 and 6 applies to that of the second embodiment, and further description thereof will be omitted.

First, referring to FIGS. 8 and 9, when the mode is changed from the normal mode to the print/picture mode, CPU 1 captures a monitor image in the print/picture mode from the image pickup unit 7 and stores it in the image memory 8 (step S61 of FIG. 8). CPU 1 then analyzes this monitor image, and then searches for a specified object image (for example, of a white rectangular figure) included possibly in the monitor image (step S62). CPU 1 then checks whether such specified object (print/picture) image has been found (step S63).

If not (NO in step S63), CPU 1 then checks whether the mode has been changed (step S64). If the mode has been changed from the print/picture mode to the normal mode, control returns to step S2 of FIG. 3. If not, control returns to step S61 where CPU 1 captures a monitor image present at this time from the image pickup unit 7 and then stores it in the image memory 8. If the monitor image includes a print/picture image (YES in step S63), control passes to step S31 of FIG. 5 where CPU 1 saves the monitor image in the image memory 8 into the first memory as in the first embodiment. Then, CPU 1 captures a monitor picture present at this time from the image pickup unit 7 and then stores it in the image memory 8 (step S32). CPU 1 then displays the monitor image stored in the image memory 8 on the monitor display screen and also displays the image stored in the first memory on a second display screen (step S33). If the zooming operation is performed in this state (YES in step S35), CPU controls the zoom drive in accordance with the zooming operation (step S36), captures a monitor image present at this time from the image pickup unit 7 and then sets it in the image memory 8 (step S37). Control then passes to step S41 of FIG. 6 where CPU 1 performs a best image specifying process in accordance with the flowchart of FIG. 9 on condition that a print/picture image is contained in the monitor image (step S43).

First, CPU 1 saves the monitor image in the image memory 8 into the second memory of the working memory 3 (step S71), reads the monitor image in the first memory, and then calculates the size (hereinafter referred to as first size) of the print/picture image in the monitor image (step S72). Similarly, CPU 1 reads the monitor image in the second memory of the working memory 3 and calculates the size (hereinafter referred to as second size) of the print/picture image area in the monitor image (step S73). CPU 1 then compares the first and second sizes, thereby specifying a larger size (step S74). If the first size is smaller than the second one (YES in step S75), CPU 1 determines that the monitor image in the second memory has a better image pickup state than that in the first memory concerning the print/picture image, and then transfers the monitor image in the second memory as a better one at this time to the first memory, thereby rewriting the same with the transferred monitor image (step S76). CPU 1 then clears the content of the second memory (step S77). If the first size is not smaller than the second one (NO in step S75), CPU 1 determines that the monitor image in the first memory has a better image pickup state than that in the second memory concerning the print/picture image. Then, CPU 1 maintains the monitor image in the first memory as the better one and clears the content of the second memory (step S77).

Then, control passes to step S40 of FIG. 5 where CPU 1 captures a monitor image present at this time from the image pickup unit 7, and then sets it in the image memory 8. Each time zooming operation is performed (step S35), CPU 1 controls the zooming drive in accordance with the zooming operation (step S36), captures a monitor image present at this time from the image pickup unit 7 and then sets it in the image memory 8 (step S37). Control then passes to step S41 of FIG. 6, thereby repeating the steps S41-S48.

As described above, the second embodiment produces advantageous effects similar to those of the first embodiment. In addition, in the second embodiment, when CPU 1 analyzes the monitor image, thereby recognizing the image pickup state of the print/picture image, CPU 1 recognizes the size of the print/picture image included in the monitor image as an image pickup state of the print/picture image, compares the sizes of the print/picture images included in the monitor images in the previous and present states such that the print/picture image picked up in its best state may be specified. That is, CPU 1 specifies the better image in accordance with the size of the print/picture area.

According to the embodiments of the present invention, monitor images for an object whose image should be picked up are sequentially analyzed. If the figure of a specified form is retrieved in a monitor image, this monitor image is automatically stored as an image candidate including a print/picture image. Thus, an image including a print/picture image can be picked up easily.

Furthermore, according to the present invention, a monitor image including a print/picture image in a best image pickup state is specified automatically from among the stored monitor images and stored at all times. While in the first and second embodiments the preset figure forms (such as, for example, represented by a rectangular figure) and background colors of a calling card, a postcard, a catalog and a whiteboard are referred to and an image part of the monitor image that matches selected ones of the figure forms and the background colors is specified as a print/picture image area, the compositions of print/picture image areas may be set as representing the characteristics of the print/picture image.

While in the first embodiment when the print/picture image area is specified, its form is considered and it is determined whether character images are included in the area of the print/picture image, the print/picture images may include signs, figures and photographs in addition to the characters.

While in the first and second embodiments the best image as it is illustrated as finally recorded on the recording media, a filtering process that filters out noise from the print/picture image area and then a hue correcting process that includes adjusting a hue of the print/picture image so as to be read out clearly may be performed.

While in the above embodiments the present invention is illustrated as applied to the portable print/picture image pickup camera for use in business meetings, thereby picking up an image of each of various materials, calling cards, postcards, catalogs or whiteboards for use in business talks, briefing sessions, deliberative councils, etc., the present invention is also applicable to a print/picture image pickup camera attached through an arm to a print/picture stand as one option in a projector. In this case, the camera may be one removable from the projector so as to pick up an image, for example, of a whiteboard. In addition, the camera may be used for any general purposes and not limited only to use in business meetings.

A recording medium (such as a CD-ROM, a flexible disk or a RAM card) that has recorded a computer readable program that when a best print/picture image is picked up, because a computer to perform the above-mentioned functions may be provided.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. An electronic camera with an image pickup unit configured to pick up image data of an object, the camera comprising:
    a temporal memory configured to temporally store the image data picked up by the image pickup unit;
    a determining unit configured to, in an automatic pickup mode, successively analyze the image data successively picked up by the image pickup unit and to successively determine whether the image data includes a predetermined object;
    a memory controller configured to temporally store the image data in the temporal memory when the determining unit determines that the image data includes the predetermined object;
    a comparator configured to successively compare the image data stored in the temporal memory with the image data successively picked up by the image pickup unit after the memory controller temporally stores the image data including the predetermined object in the temporal memory;
    an updating unit configured to update the image data stored in the temporal memory with the image data picked up by the image pickup unit each time it is determined that a quality of the image data picked up by the image pickup unit is higher than a quality of the image data stored in the temporal memory; and
    a storage controller configured to store the image data that is stored in the temporal memory in a storage medium when, after the memory controller temporally stores the image data in the temporal memory, the determining unit determines that the image data picked up by the image pickup unit does not include the predetermined object.

2. The electronic camera of claim 1, wherein the determining unit is configured to determine whether the image data includes the predetermined object by determining whether the image data includes an object having a predetermined shape.

3. The electronic camera of claim 1, wherein the determining unit is configured to determine whether the image data includes the predetermined object by determining whether the image data includes a recognizable character.

4. The electronic camera of claim 3, wherein the comparator is configured to compare a character recognition rate of the image data stored in the temporal memory with a character recognition rate of the image data picked up by the image pickup unit, and
    wherein the updating unit is configured to update the image data stored in the temporal memory with the image data picked up by the image pickup unit when the character recognition rate of the image data picked up by the image pickup unit is higher than the character recognition rate of the image data stored in the temporal memory.

5. The electronic camera of claim 1, wherein the comparator is configured to compare a size of the predetermined object included in the image data stored in the temporal memory with a size of the predetermined object included in the image data picked up by the image pickup unit, and
    wherein the updating unit is configured to update the image data stored in the temporal memory with the image data picked up by the image pickup unit when the size of the predetermined object included in the image data picked up by the image pickup unit is larger than the size of the predetermined object included in the image data stored in the temporal memory.

6. The electronic camera of claim 1, wherein the image pickup unit is configured to automatically pick up the image data of the predetermined object in the automatic pickup mode, and wherein the camera is settable to a normal mode in which the image pickup unit is configured to pick up the image data in response to a shutter operation of a user.

7. The electronic camera of claim 6, wherein the memory controller is configured to: (i) display the image data stored in the temporal memory as candidates, (ii) display a guidance asking the user whether the image data stored in the temporal memory is to be stored in the storage medium, and (iii) store the image data that is stored in the temporal memory in the storage medium when the user instructs the image data to be stored in the storage medium.

8. A computer-readable storage medium having a computer-readable program stored thereon that is executable by an electronic camera including an image pickup unit configured to pick up image data of an object, and a temporal memory configured to temporally store the image data picked up by the image pickup unit, the program controlling the electronic camera to perform functions comprising:

in an automatic pickup mode, successively analyzing the image data successively picked up by the image pickup unit and successively determining whether the image data includes a predetermined object;

temporally storing the image data in the temporal memory when it is determined that the image data includes the predetermined object;

successively comparing the image data stored in the temporal memory with the image data successively picked up by the image pickup unit, after the image data including the predetermined object is temporally stored in the temporal memory;

updating the image data stored in the temporal memory with the image data picked up by the image pickup unit each time it is determined that a quality of the image data picked up by the image pickup unit is higher than a quality of the image data stored in the temporal memory; and storing the image data that is stored in the temporal memory into a storage medium when, after the image data is temporally stored in the temporal memory, it is determined that the image data picked up by the image pickup unit does not include the predetermined object.

* * * * *